Figure 1:
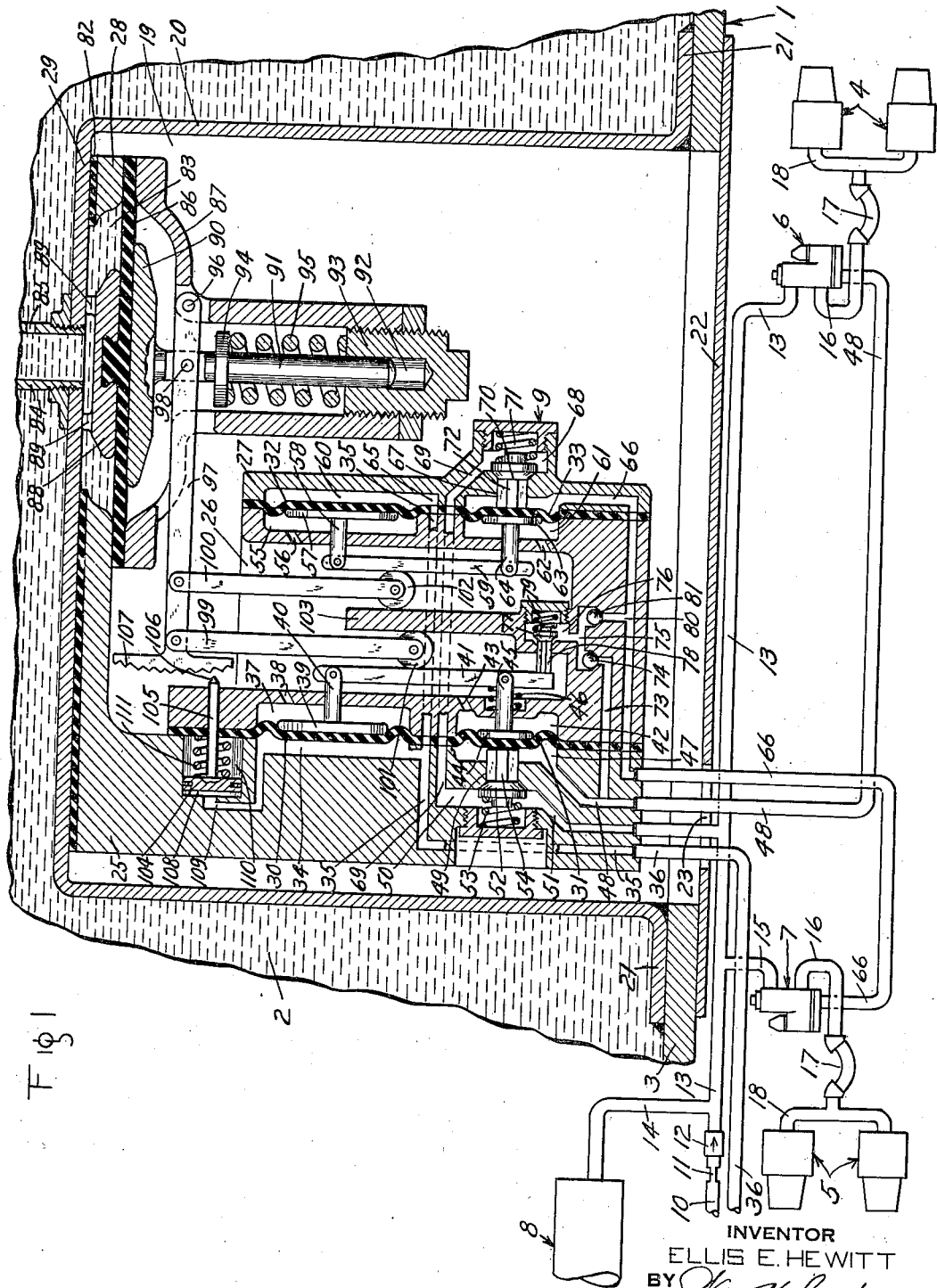

Dec. 26, 1939. E. E. HEWITT 2,184,551
VARIABLE LOAD BRAKE
Filed June 10, 1937 2 Sheets-Sheet 2

INVENTOR
ELLIS E. HEWITT
BY Wm. M. Cady
ATTORNEY

Patented Dec. 26, 1939

2,184,551

UNITED STATES PATENT OFFICE 2,184,551

VARIABLE LOAD BRAKE

Ellis E. Hewitt, Edgewood, Pa., assignor to The Westinghouse Air Brake Company, Wilmerding, Pa., a corporation of Pennsylvania Application June 10, 1937, Serial No. 147,456

36 Claims. (Cl. 303—22)

This invention relates to variable load brake equipment for vehicles and more particularly for locomotive tenders.

In operating trains it is the practice to fully load the locomotive tender with both water and fuel preparatory to starting on a run, the weight of the water load being greatly in excess of that of the fuel load.

The construction of the modern locomotive tender is such that with the tender fully loaded the major portion of the weight of the water load is carried by the rear truck while the front truck carries the weight of the remaining portion of the water load as well as substantially all of the weight of the fuel load. This weight of the water carried by the front truck slightly exceeds that of the fuel, and the weight of the water load carried by the rear truck will exceed the combined weights of the water and fuel load carried by the front truck.

From this it will be seen that a braking power which is suitable for the rear or heavily loaded truck will be entirely too great for the front or lightly loaded truck and that a braking power suitable for the front truck will be inadequate for the rear truck, and with this in mind it is the principal object of the invention to provide a variable load brake equipment for locomotive tenders which will, at all times in effecting an application of the brakes, provide greater braking power on the rear or heavily loaded truck and a lesser braking power on the other or lightly loaded truck, and which will operate to automatically vary the braking power on both trucks according to variations in the weight of the water carried by the tender.

On a long run it is not unusual to refill the water compartment of a locomotive tender two or three times to one filling of the fuel compartment, which refilling is usually accomplished while the locomotive is in motion by means of a water scoop which is lowered from the tender into a water supply contained in a trough located between the track rails. The fuel compartment cannot be refilled while the tender is in motion so that the weight of the fuel load will gradually reduce until the end of the run is reached. From this it will be understood that the greatest and most rapid variation in the weight of the load carried by the tender is due to variations in the amount of water carried. Since the rear truck carries the greater portion of the weight of the water load, it follows that this truck will be subjected to greater variation in the weight of the load than the front truck, so that it is desirable to increase or decrease the braking power on the rear truck a greater degree than on the front truck as variation in the weight of the load occurs.

With the above in mind, another object of the invention is to provide a variable load brake equipment for locomotive tenders which will in effecting an application of the brakes, provide greater braking power on the rear or heavily loaded truck and a lesser braking power on the front or lightly loaded truck and which will operate to so automatically vary the braking power on both trucks according to variation in the weight of water carried by the tender that the variation in the braking power on the rear truck will be greater than that on the front truck.

Other objects and advantages will appear in the following more detailed description of the invention.

Figure 2:
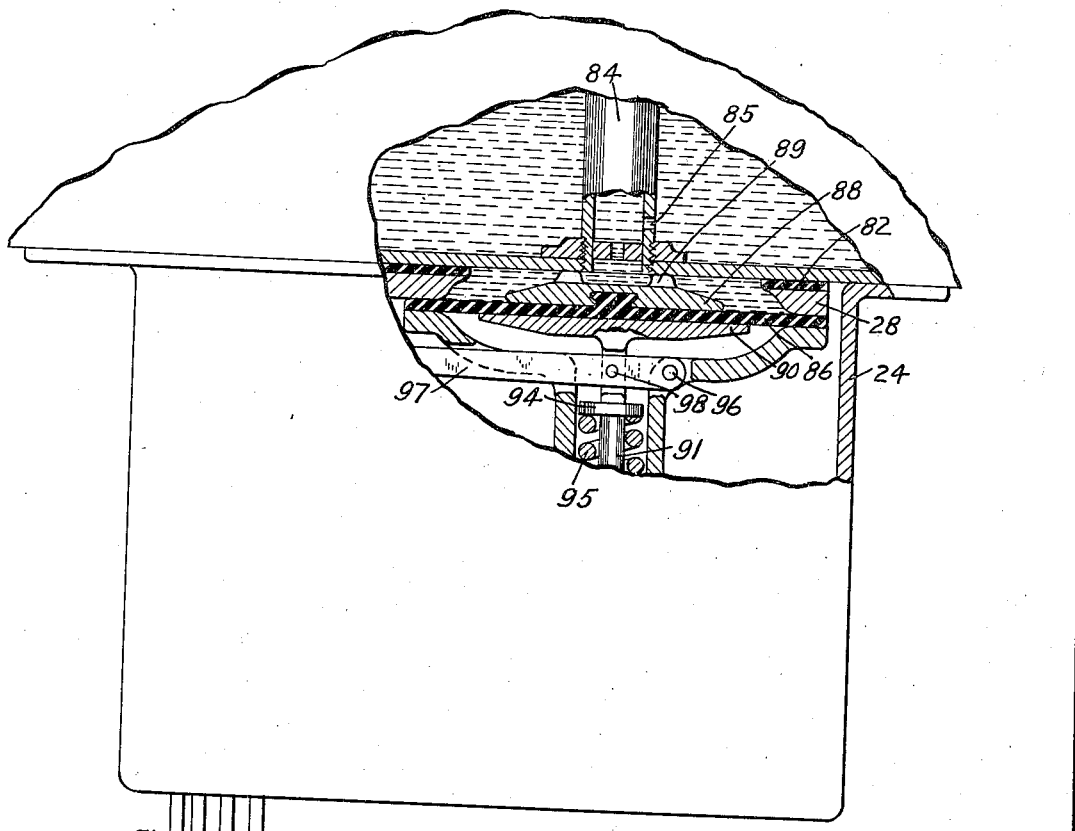

As shown in the accompanying drawings, Fig. 1 is a diagrammatic view, mainly in section, of a variable load brake equipment embodying the invention, a portion of the apparatus being shown embedded in the water compartment of a locomotive tender, and Fig. 2 is a side elevational view, partly in section, of the control portion of the mechanism mounted exteriorly on the tender and covered by a guard casing secured to the tender.

In the drawings the reference character 1 indicates the body of a locomotive tender which is provided with a water compartment 2 having a bottom 3 and the usual side end and top walls, not shown, and is further provided with the usual fuel compartment, not shown. The body of the tender is spring supported in the usual manner on front and rear trucks which have not been shown but which may be of any desired construction.

The water compartment of the modern tender is usually of such a length as to extend over both trucks while the fuel compartment which is located at the front end of the body and partially surrounded by the water compartment, is much shorter and extends over the front truck only.

As shown in Fig. 1 the variable load brake equipment may comprise a pair of brake cylinders 4 for controlling the brakes on the rear truck and a pair of brake cylinders 5 for controlling the brakes on the front truck, and may further comprise relay valve devices 6 and 7, a reservoir 8 and a control valve mechanism 9.

The reservoir 8 is connected to the main reservoir pipe 10 on the locomotive, through restriction 11 in the pipe 10, a check valve device 55

12, a pipe 13 and a branch pipe 14, so that the reservoir will be charged with fluid at main reservoir pressure.

The relay valve devices 6 and 7 are identical with each other and with the relay valve device fully shown and described in my pending application Serial No. 740,202 filed August 17, 1934, and are so arranged that the device 6 will control the operation of the brake cylinders 4 and the device 7 will control the operation of the brake cylinders 5. The pipe 13 and consequently the reservoir 8 is connected directly to the supply valve chamber of the relay valve device 6 and is connected through a branch pipe 15 to the corresponding supply valve chamber of the relay valve device 7. The chamber in the relay valve device 6 into which the supply valve device is adapted to admit fluid under pressure from the reservoir 8 and from which the exhaust valve of the device is adapted to release fluid, is connected through a pipe 16, a flexible conduit 17 and a pipe 18 to the brake cylinders 4. The corresponding chamber of the relay valve device 7 is connected in the same manner to the brake cylinders 5. The flexible conduits 17 are employed when the brake cylinders are mounted on the trucks but when they are to be mounted on the body the conduits are omitted and the pipe 16 is connected directly to the pipe 18.

The control valve device 9 is wholly contained within a recess 19 provided in the bottom of the water compartment of the tender, which recess is defined by an inverted pan shaped member 20 having outwardly extending lateral flanges 21 which are secured to and made water tight with the bottom wall 3 of the tender by welding. The open end of the recess is closed by a plate 22 which is located exteriorly of the water compartment and which is adapted to be removably secured to the bottom wall 3, the plate being provided with an opening 23 for the accommodation of pipes hereinafter described which are connected to the control valve device.

With the device thus enclosed within the body of the water compartment, it will be well protected against damage and freezing temperatures. In some cases it may be desirable to mount the control valve device wholly outside of the tender as shown in Fig. 2 and when this is done the device may be enclosed by a cover 24 which may be secured to the bottom wall 3 of the tender in any desired manner.

The control valve mechanism may comprise casing sections 25, 26 and 27 which are secured together in any desired manner, the casing section 25 being provided with a bracket portion 28 which is secured to the top wall 29 of the member 20.

Clamped between the casing sections 25 and 26 is a gasket having spaced flexible diaphragms 30 and 31, and clamped between the casing sections 26 and 27 is a similar gasket having spaced flexible diaphragms 32 and 33. The diaphragms 30 and 32 are preferably of equal area and are each of greater area than diaphragm 31 or diaphragm 32, which latter diaphragms are of equal area.

At one side of the diaphragm 30 is a chamber 34 which is connected through a passage 35 to a pipe 36 which is connected to the locomotive brake cylinder pipe leading from the usual locomotive distributing valve device. The locomotive brake cylinder pipe and distributing valve device have not been shown, but it will be understood that these parts may be connected with the tender equipment in the same manner as shown in a patent of Clyde C. Farmer, No. 2,110,704, issued March 8, 1938. At the other side of the diaphragm is a chamber 37 which is connected through a passage 38 to the atmosphere and which contains a follower 39 having a stem 40 which extends through an opening in the casing section 26. The outer end of this stem is pivotally connected to the upper end of a vertically disposed tiltable scale-beam 41.

At one side of the diaphragm 31 is a chamber 42 which is connected through a passage 43 to the atmosphere and which contains a follower 44 having a stem 45 which extends through an opening in the casing section. The outer end of the follower stem is pivotally connected to the beam 41 at a point located a short distance above the lower end of the beam. Interposed between and operatively engaging the beam 41 and the casing section 26 and surrounding the follower stem 45 is a spring 46. At the other side of the diaphragm is a chamber 47 which is connected through a passage and pipe 48 to the piston chamber of the relay valve device 6. Diaphragm chamber 47 is also connected to a passage 49 leading from a chamber 50 which is connected through a passage and pipe 51 to the pipe 13 and consequently to the reservoir 8. Contained in chamber 50 is a supply valve 52 which is adapted to be operated to control communication through passage 49, which valve is normally maintained seated, closing communication through passage 49, by means of a spring 53 also contained in chamber 50. This valve is provided with a fluted stem 54 which extends through the passage 49 into diaphragm chamber 47 where it is adapted to be engaged by the diaphragm 31.

At one side of the diaphragm 32 is a chamber 55 which is connected through a passage 56 to the atmosphere and which contains a follower 57 having a stem 58 which extends through an opening in the casing section 26. The outer end of this stem is pivotally connected to a vertically disposed scale-beam 59. At the other side of the diaphragm is a chamber 60 which is connected to the passage 35.

At one side of the diaphragm 33 is a chamber 61 which is connected through a passage 62 to the atmosphere and which contains a follower 63 having a stem 64 which extends through an opening in the casing section 26. The outer end of this stem 64 is pivotally connected to the lower end of the beam 59. At the other side of the diaphragm is a chamber 65 which is connected through passage and pipe 66 to the piston chamber of the relay valve device 7. Chamber 65 is connected to a passage 67 which leads to a chamber 68 connected through a passage 69 to the valve chamber 50 and consequently to the reservoir 8. Contained in chamber 68 is a supply valve 70 which is adapted to be operated to control communication through passage 67, which valve is normally maintained seated to close communication through passage 67 by means of a spring 71. The valve 70 is provided with a fluted stem 72 which extends through the passage 67 into chamber 65 where it is adapted to be engaged by the flexible diaphragm 33.

Passage 48 leading from the diaphragm chamber 47 is connected through a passage 73, past a ball check valve 74 and passage 75 to an exhaust valve chamber 76 in the casing section 26. Contained in chamber 76 is an exhaust valve 77 having a fluted stem 78 which extends through an opening in the casing section, the end of said stem being adapted to be engaged by the lower end of the beam 41. Normally the spring 46 which surrounds the follower stem 45 acts through the medium of the beam 41 and stem 78 to maintain the exhaust valve 77 unseated against the opposing action of a spring 79 contained in valve chamber 76. The passage 66 is connected through passage 80 past a ball check valve 81 and passage 75 to the exhaust valve chamber 76.

Clamped between the bracket portion 28 of the casing section 25 and the top wall 29 of the member 20 is a gasket 82 which provides a water tight seal between the wall 29 and the bracket portion 28.

The bracket portion 28 is provided with an opening 83 which is in constant open communication with the interior of a vertically disposed tubular member 84 which extends into the water compartment 2 and which, at its lower end, has screw threaded connection with the wall 29 of the member 20. The interior of the tubular member is connected to the water compartment 2 through a passage 85 of relatively small flow area located above the wall 29 and below the level which the water reaches when the tender may be considered as lightly loaded.

Extending across and closing the opening 83 at the lower face of the bracket portion 28, is a flexible diaphragm 86 which, adjacent its periphery, is clamped between the bracket portion and a downwardly depending hollow casing section 87 to provide a water tight seal between the bracket portion and the diaphragm.

Contained in the chamber 83 and secured to the diaphragm 86 is a follower 88 having on its upper surface upwardly extending lugs 89 which are adapted to engage with the wall 29 of the member 20 to limit upward movement of the diaphragm. Operatively engaging the lower surface of the diaphragm 86 is a follower 90 having a downwardly depending stem 91 which, at its lower end, is slidably guided in the central bore 92 in an adjusting nut 93 having screw threaded connection with the hollow casing section 87. At a point located a short distance below the follower 90, the follower stem 91 is provided with a collar 94, and interposed between and operatively engaging the collar and the adjusting nut 93 is a spring 95 which tends to move the diaphragm assembly upwardly.

Pivotally fulcrumed at one end to a pin 96 secured to the hollow casing section 87 is an adjusting lever 97 which, at a point located a short distance to the left of the fulcrum pin 96, is operatively connected to the follower stem 91 by means of a pin 98 which, in a vertical direction, is located intermediate the follower 90 and the collar 94. The lever, adjacent its other end, has pivotally connected thereto the upper ends of spaced vertically disposed links 99 and 100, to the lower ends of which are pivotally connected fulcrum members 101 and 102, respectively, the member 101 being interposed between and operatively engaging the lever 41 and one side of a vertically disposed web 103 of the casing section 26, and the member 102 being interposed between and operatively engaging the beam 59 and the opposite side of the web 103. Both fulcrum members are movable either upwardly or downwardly in a vertical direction by the lever 97 which is adapted to be operated by the flexible diaphragm 86 in response to variations in the amount of water carried in the water compartment 2, as will hereinafter more fully appear.

The link 99 is longer than the link 100 so that the fulcrum point of the fulcrum member 101 will, at all times be below the fulcrum point of the member 102. Since, as shown in Fig. 1, the followers 57 and 63 are spaced the same distance apart as the followers 39 and 44, the fulcrum members 101 and 102 will, at all times, cooperate with the beams 41 and 59 to provide a greater braking power on the rear truck than on the front truck, all of which will hereinafter more fully appear.

The pivotal connection between the link 99 and lever 97 is preferably located nearer the end of the lever than the connection between the link 100 and the lever, consequently the fulcrum member 101, carried by the link 99 will be moved a greater distance than the fulcrum member 102 for a given adjusting movement of the diaphragm 83, follower stem 91 and lever, thus providing for a greater increase or decrease, as the case may be, in braking power on the rear truck than on the front truck. This is as it should be for it is the rear truck which is subjected to the greatest variations in the weight carried.

Operatively mounted in the casing section 25 is a piston 104 having a stem 105 which passes through an opening in the casing section 26 and which, at its outer end, is provided with a locking tooth 106 which, through the medium of the stem, is adapted to be moved by the piston into and out of locking engagement with the locking teeth 107 which are provided on the left hand end of the adjusting lever 97. At one side of the piston is a chamber 108 which is connected through a passage 109 to the diaphragm chamber 34, and at the other side is provided with a chamber 110 which may be connected to the atmosphere by way of the clearance space between the piston stem 104 and the casing section 26 and which contains a spring 111 which at all times tends to move the piston to its normal position as shown in Fig. 1.

*Operation of the equipment*

Assuming the water compartment 2 to be lightly loaded, the spring 95 acts to maintain the follower stem 91 and thereby the follower 90, flexible diaphragm 86 and follower 88 in their upper position against the opposing pressure of the water in chamber 82 acting on the upper side of the diaphragm, the stop lugs 89 on the follower 88 engaging the wall 29 of the member 20 to prevent upward movement of the diaphragm and follower assembly.

With the brakes released, the piston chamber of the relay valve device 6 is maintained connected to the atmosphere by way of pipe and passage 48, passage 73, past the ball check valve 74, passage 75, exhaust valve chamber 76 and past the unseated exhaust valve 77 and its fluted stem 78. The piston chamber of the relay valve device 7 is connected to the atmosphere by way of pipe and passage 66, passage 80, past the ball check valve 81, passage 75, exhaust valve chamber 76 and exhaust valve 77.

Since the piston chambers of the relay valve devices 6 and 7 are connected to the atmosphere as just described, the devices will be in their normal release positions in which the fluid pressure supply valves, thereof will be seated, and the release valves will be open. With the release valves of the relay valve devices open the brake cylinders 4 and 5 are connected to the atmosphere by way of pipes 18, flexible conduits 17, pipes 16 and past the open exhaust valves.

In charging the equipment, fluid under pressure supplied to the main reservoir of the locomotive flows through pipe 10, restriction 11 and check valve device 12 to pipe 13 and from thence flows through branch pipe 14 to the reservoir 8. From the passage 13 fluid under pressure flows directly to the supply valve chamber of the relay valve device 6 and also flows through branch pipe 15 to the supply valve chamber of the relay valve device 7. From this it will be understood that the reservoir 8 and supply valve chambers of the relay valve devices as well as the pipes connecting these volumes are normally charged with fluid at main reservoir pressure.

It should here be mentioned that the restriction 11 which is carried by the locomotive is provided for the purpose of preventing the rapid and serious loss of locomotive main reservoir pressure in effecting an application of the brakes in the event of the bursting of the hose which hose, although not shown, may be employed to connect the locomotive main reservoir pipe to the pipe 13 on the tender, and that the check valve device 12 is provided to prevent the loss of fluid under pressure from the reservoir 8 in case the above mentioned hose bursts.

Now, when the distributing valve device on the locomotive is caused to move to application position, fluid under pressure is supplied to the locomotive brake cylinder pipe and consequently to the locomotive brake cylinders in the usual well known manner.

From the locomotive brake cylinder pipe fluid under pressure flows to the pipe 36 on the tender and from thence flows through pipe 36 and passage 35 to the diaphragm chambers 34 and 60 of the control valve device 9, causing the diaphragms 30 and 32, respectively, to flex outwardly. The diaphragm 30 as it is thus being flexed, acts through the medium of the follower 39 and follower stem 40 to rock the beam 41 about the fulcrum member 101 in a clockwise direction, the beam 41, as it is thus operated, permitting the spring 79 to act to seat the exhaust valve 77 to close the atmospheric communication from the brake cylinders. After the exhaust valve has been seated the beam acts through the medium of the stem 45 of the follower 44 and flexible diaphragm 31 to shift the supply valve 52 from its seat against the opposing pressure of the spring 53. With the supply valve thus unseated, fluid under pressure now flows from the reservoir 8 to the piston chamber of the relay valve device 6 by way of pipe 14, pipe 13, pipe and passage 51, supply valve chamber 50, past the supply valve 52 and its fluted stem 54, diaphragm chamber 47, and passage and pipe 48. In response to the pressure of fluid thus supplied, the relay valve device 6 operates to close the atmospheric communication from the brake cylinders 4 on the rear truck and to connect the supply valve chamber to the chamber connected to the pipe 16 leading to the brake cylinders 4, so that an application of the brakes on the rear truck is effected.

The flexible diaphragm 32 as it is being flexed acts through the medium of the follower 57 and follower stem 58 to rock the beam 59 in a counterclockwise direction about the fulcrum member 102, the beam, as it is thus being moved, acting through the medium of the follower stem 64, follower 63 and diaphragm 33 to cause the supply valve 70 to be unseated against the opposing pressure of the spring 71. With the valve unseated, fluid under pressure from the reservoir 8 flows through pipe 14, pipe 13, pipe and passage 51, supply valve chamber 50, passage 69, supply valve chamber 68, past the unseated valve 70 and its fluted stem 72, chamber 65, and passage and pipe 66 to the piston chamber of the relay valve device 7. Fluid under pressure thus supplied causes the relay valve device to operate to close the atmospheric communication from the brake cylinders 5 on the front truck and to operate the supply valve to supply fluid under pressure from the pipe 13 and consequently from the reservoir 8 to the brake cylinders by way of pipe 16, thus effecting an application of the brakes on the front truck of the tender.

It will here be noted that fluid under pressure supplied to the passages 48 and 66 will flow past the ball check valves 74 and 80 to the exhaust valve chamber 76, but since the exhaust valve 77 has been previously closed by the operation of the beam 41 there will be no escape of air from this chamber while the brakes are being applied.

When the pressure of fluid in diaphragm chamber 47 and consequently in the brake cylinders 4 on the rear truck of the tender becomes sufficient to overcome the pressure of fluid in chamber 34 acting on the beam 41 through the medium of the flexible diaphragm 30 follower 39, and follower stem 40, the diaphragm 31 will be caused to flex in a direction toward the right hand and thereby permit the spring 53 to seat the supply valve 52, thereby closing off the further flow of fluid to the chamber 42 and piston chamber of the relay valve device 6. Since no further build up of pressure in chamber 47 can now occur, the diaphragm 31, follower 34, follower stem 45, and beam 41 will come to a stop before the beam can cause the exhaust valve 77 to be unseated. When the pressure of fluid in diaphragm chamber 65 and consequently in the piston chamber of relay valve device 7 becomes sufficient to overcome the pressure of fluid in diaphragm chamber 60 acting through the medium of the diaphragm 32, follower 57 and follower stem 58 and beam 59, the spring 71 is permitted to act to seat the supply valve 70 so as to close off the further flow of fluid to the diaphragm chamber 65 and piston chamber of the relay valve device. With the supply valve seated there will be no further build up of pressure in chamber 65 consequently the diaphragm 33, follower 63, follower stem 64 and beam 59 will come to a stop.

It will here be noted that due to the position of the fulcrum members 101 and 102 with relation to each other it will require a greater pressure in chamber 47 to overcome the pressure of fluid in diaphragm chamber 34 than is required in chamber 65 to overcome the pressure in diaphragm chamber 60, so that the brake cylinder pressure on the rear truck of the tender will be greater than that on the front truck.

Fluid under pressure supplied to the diaphragm chamber 34 flows through passage 109 to the piston chamber 108 and causes the piston 104 and its stem 105 to be shifted in a direction toward the right hand, the outer end or tooth 106 of the stem as it is thus shifted engaging the teeth 107 of the adjusting lever 97 so as to lock the lever against movement due to changes in the water pressure in the diaphragm chamber 83 caused by the surging of water in the water compartment.

When the distributing valve device of the locomotive is caused to move to release position, fluid under pressure is vented from the locomotive brake cylinder pipe and locomotive brake cylinders in the usual manner, and since the pipe 36 on the tender is in communication with the locomotive brake cylinder pipe, fluid under pressure will also be vented from the diaphragm chambers 34 and 69 and piston chamber 108 of the control valve device 9. With the diaphragm chamber 34 vented, fluid under pressure in chamber 47 causes the diaphragm 31 to flex further to the right and cause the beam 41 to rock in a clockwise direction and unseat the release valve 77. With the valve 77 unseated, fluid under pressure is vented from the piston chambers of the relay valve devices 6 and 7 by way of passage 75, release valve chamber 76 and past the open release valve 77 and its fluted stem 78 to the atmosphere.

When the pressure of fluid in piston chamber 108 has been reduced almost to atmospheric pressure, the spring 111 acts to shift the piston 108 and thereby the stem 105 to their normal position as shown in Fig. 1, in which position the locking tooth 106 on the stem will be out of locking engagement with the teeth 107 on the adjusting lever 97, thus rendering the adjusting lever freely movable under variations in the pressure of water in chamber 83.

Upon refilling the water compartment, the pressure of the water on the diaphragm 86 increases and causes the diaphragm to act to move the stem 91 downwardly against the opposing action of the spring 95, the stem, due to its pivotal connection with the adjusting lever 97, causing the lever to rock in a counterclockwise direction about the fulcrum pin 96. The lever as it is thus rocked moves both the fulcrum member 101 and the fulcrum member 102 downwardly along the beams 41 and 59, respectively, from their light load positions in which they are shown to their heavy load positions. The fulcrums in this position condition the control valve device so that it will not operate to cut off the flow of fluid to the brake cylinders 4 and 5 in effecting an application of the brakes until the pressure in each brake cylinder has been increased considerably above that when the device had been conditioned to provide under the light load.

As the water in the water compartment 2 is being used, the pressure of water in chamber 83 of course decreases and the spring 95 acts to move the stem 91, follower 90 and diaphragm 86 upwardly causing the lever 97 to move the fulcrum members 101 and 102 upwardly along the beams 41 and 59, respectively. From this it will be understood that when the fulcrum members 101 and 102 are moved downwardly the control valve device 9 will be conditioned to provide for heavy load braking and when moved upwardly will provide for light load braking and that the adjustment for positioning of the fulcrum members is effected through the medium of the adjusting lever 97, follower stem 91, follower 90 and flexible diaphragm 86 according to variations in the amount of water carried in the water compartment 2.

While two illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a variable load brake equipment for a vehicle having a load carrying body and two trucks, in combination, a mechanism operative to effect an application of the brakes on both trucks and to provide a heavier degree of braking on the heavier weighted truck and a lighter degree of braking on the lighter weighted truck, said mechanism being adjustable to vary the degree of braking on each truck, and a single device responsive to variations in the amount of load carried by the body of the vehicle for adjusting said mechanism.

2. In a variable load brake equipment for a vehicle having a load carrying body and two trucks, in combination, a mechanism operative to effect an application of the brakes on both trucks and to provide a heavier degree of braking on the heavier weighted truck and a lighter degree of braking on the lighter weighted truck, said mechanism being adjustable to vary the degree of braking on each truck, and to provide a greater variation in the degree of braking power on the heavier weighted truck than on the lighted weighted truck, and a single device operative according to variations in the weight of the load carried by the body of the vehicle for adjusting said mechanism.

3. In a variable load brake equipment for a vehicle having a load carrying body and two trucks, in combination, a mechanism operative to effect an application of the brakes on both trucks and to provide a heavier degree of braking on the heavier weighted truck and a lighter degree of braking on the lighter weighted truck, said mechanism being adjustable to vary the degree of braking on each truck, a single mechanism responsive to variations in the amount of load carried by the body of the vehicle for adjusting said mechanism, and means automatically operative upon the initiation of an application of the brakes for locking the adjusting means against movement from its adjusted position.

4. In a variable load brake equipment for a vehicle having a load carrying body and two trucks, in combination, a mechanism operative to effect an application of the brakes on both trucks and to provide a heavier degree of braking on the heavier weighted truck and a lighter degree of braking on the lighter weighted truck, said mechanism being adjustable to vary the degree of braking on each truck, a single mechanism responsive to variations in the amount of load carried by the body of the vehicle for adjusting said mechanism, and means automatically operative upon the initiation of an application of the brakes for locking the adjusting means against movement from its adjusted position, and automatically operative upon effecting the subsequent release of the brakes to unlock the adjusting means.

5. In a variable load brake equipment for a vehicle having two trucks, in combination, mechanism operative to effect an application of the brakes on the truck carrying the heaviest weight, means operative to condition the mechanism to vary the braking power on said truck, mechanism operative to effect an application of the brakes on the other truck, means operative to condition the second mentioned mechanism to vary the braking power on said other truck, a lever cooperating with both of the conditioning means to move the first mentioned means a greater distance than the other to condition the first mentioned mechanism to provide a greater degree of variation in braking power on truck carrying the heaviest weight than on the other, and means operated according to variations in the amount of the load carried by the vehicle for actuating said lever.

6. In a variable load brake equipment for a locomotive tender having a fuel compartment and a water compartment and also having a front and a rear truck, in combination, a mechanism operative to effect an application of the brakes on both trucks and to provide a heavier degree of braking on the rear truck than on the front truck, said mechanism being adjustable to vary the degree of braking on each truck, and means in communication with the water compartment and responsive to variations in the amount of water carried in the water compartment for adjusting said mechanism.

7. In a variable load brake equipment for a locomotive tender having a front and a rear truck, in combination, a mechanism operative to effect an application of the brakes on both trucks and to provide a heavier degree of braking on the rear truck than on the front truck, said mechanism being adjustable to vary the degree of braking on each truck, and to provide a greater variation in the degree of braking power on the rear truck than on the front truck, and means in contact with the water carried by the tender operative according to variations in the weight of the water for adjusting said mechanism.

8. In a variable load brake equipment for a locomotive tender having a water compartment and a fuel compartment and also having two trucks, in combination, a mechanism operative to effect an application of the brakes on both trucks and being adjustable to vary the braking power on each truck independently of the other, and means in communication with said water compartment responsive to variations in the amount of water carried in the water compartment for adjusting said mechanism.

9. In a variable load brake equipment for a locomotive tender having a water compartment and a fuel compartment and also having two trucks, in combination, a mechanism operative to effect an application of the brakes on both trucks and being adjustable to vary the braking power differently on each truck and independently of the other, and means in communication with the water compartment responsive to variations in the weight of the water carried in the water compartment for adjusting said mechanism.

10. In a variable load brake equipment for a locomotive tender having a water compartment and a fuel compartment and also having two trucks, in combination, a mechanism operative to effect an application of the brakes on both trucks and being adjustable to vary the braking power on each truck independently of the other, means operative to adjust said mechanism, and lever means in direct communication with the water compartment responsive to variations in the weight of water carried in the water compartment for actuating said means.

11. In a variable load brake equipment for a locomotive tender having two trucks, in combination, a mechanism operative to effect an application of the brakes on both trucks and being adjustable to vary the braking power on each truck independently of the other, means operative to adjust said mechanism, a lever for actuating said means, a spring, and means subject to the opposing pressures of said spring and the water carried by the tender and operative according to variation in the weight of the water for actuating said lever.

12. In a variable load brake equipment for a locomotive tender having a body adapted to carry water and fuel and having front and rear trucks, in combination, a mechanism operative in effecting an application of the brakes to provide a different degree of braking power on each truck and adapted to be conditioned for varying the degree of braking power on both trucks, and a single mechanism controlled according to variations in the amount of water carried by the tender body and independently of said trucks for conditioning said mechanism.

13. In a variable load brake equipment for a locomotive tender having a water compartment and a fuel compartment and also having front and rear trucks, in combination, a mechanism operative in effecting an application of the brakes to provide a different degree of braking power on each truck, means operative to condition the mechanism for varying the degree of braking power on both trucks, and means in communication with said water compartment responsive to variations in the amount of water carried in the water compartment for conditioning said mechanism.

14. In a variable load brake equipment for a locomotive tender having a water compartment and a fuel compartment and also having front and rear trucks, in combination, a control valve mechanism operative by fluid under pressure to provide a different degree of braking power on each truck, and means operative to condition the control valve device for varying the degree of braking power on both trucks, and means in communication with said water compartment responsive to variations in the pressure of water carried in the water compartment for actuating said means.

15. In a variable load brake equipment for a locomotive tender having a water compartment and a fuel compartment and also having front and rear trucks, in combination, a brake controlling valve device operative in effecting an application of the brakes to provide a different degree of braking power on each truck and being adjustable to vary the degree of braking power on each truck, means for adjusting the brake controlling valve device, a lever for actuating said means, and means in communication with said water compartment responsive to variations in the amount of water carried in the water compartment for actuating said lever.

16. In a variable load brake equipment for a locomotive tender, in combination, a front and a rear truck for the tender, a brake controlling valve device operative in effecting an application of the brakes to provide a greater braking power on the rear truck than on the front truck and adapted to be conditioned to vary the braking power on both trucks, and means in contact with the water carried by the tender responsive to variations in the weight of the water for conditioning the brake controlling valve device.

17. In a variable load brake equipment for a locomotive tender, in combination, a front and a rear truck for the tender, a brake controlling valve device operative by fluid under pressure in effecting an application of the brakes to provide a greater degree of braking power on the rear truck than on the front truck and adapted to be conditioned to vary the braking power on both trucks, means for conditioning said brake controlling valve device, a lever operable to actuate said means, and means in contact with the water carried by the tender responsive to variations in the pressure of the water for actuating said lever.

18. In a variable load brake for a vehicle having a load carrying body and a plurality of trucks, in combination, control valve means operative to effect an application of the brakes, mechanism controlling said control valve means to provide a heavier application of the brakes on one truck than on the other and being adjustable to condition said control valve means to provide either a heavier or lighter application of the brakes on each truck, and a single device responsive to variations in the weight of lading carried by the body of the vehicle for actuating said mechanism.

19. In a variable load brake for a vehicle having a load carrying body and a plurality of trucks, in combination, a brake controlling valve device operative in effecting an application of the brakes to provide a higher degree of braking on one of said trucks than the other and adapted to be conditioned to provide either an increased or decreased degree of braking on each truck, means for conditioning said brake controlling valve device, and a single mechanism responsive to variations in the pressure of lading carried by the body of the vehicle for actuating said means.

20. In a variable load brake for a vehicle having a load carrying body and a plurality of trucks, in combination, a brake cylinder for each truck, valve means operative in effecting an application of the brakes to supply fluid under pressure to one of said brake cylinders to provide a certain degree of braking pressure, valve means operative in effecting an application of the brakes to supply fluid under pressure to the other of said brake cylinders to provide a different degree of braking pressure, means operative to condition both of said valve means to control the supply of fluid under pressure to both brake cylinders to provide either a decreased or an increased degree of braking pressure on both trucks, and a single mechanism operative according to variations in the weight of a lading carried by the body of the vehicle for actuating said means.

21. In a variable load brake for a vehicle having a load carrying body and a plurality of trucks, in combination, a brake cylinder for each of said trucks, valve means operative in effecting an application of the brakes to supply fluid under pressure to one brake cylinder, valve means operative in effecting an application of the brakes to supply fluid under pressure to the other brake cylinder, means conditioning both of said valve means to control the supply of fluid under pressure to both brake cylinders to provide different degrees of braking pressure on each truck, said means being adjustable to condition both of said valve means to provide either an increase or a decrease in braking pressure on each truck, and a single mechanism operative according to variations in the weight of the lading carried by the body of the vehicle for adjusting said means.

22. In a variable load brake for a vehicle having a plurality of trucks, in combination, a brake cylinder for each of said trucks, valve means normally connecting both of said brake cylinders to the atmosphere and operative in effecting an application of the brakes to cut off the atmospheric communication from the brake cylinders and to supply fluid under pressure to one brake cylinder, valve means operative in effecting an application of the brakes to supply fluid under pressure to the other brake cylinder, and means conditioning both of said valve means to supply fluid under pressure to the brake cylinders to provide a different degree of braking on one truck over that on the other truck, said means being automatically adjustable according to variations in the weight of lading carried by the vehicle for conditioning both of said valve means to supply fluid under pressure to the brake cylinders to either increase or decrease the degree of braking on each truck.

23. In a variable load brake for a vehicle having a load carrying body and a plurality of trucks, in combination, a brake cylinder for each of said trucks, valve means operative in effecting an application of the brakes to supply fluid under pressure to one brake cylinder, valve means operative in effecting an application of the brakes to supply fluid under pressure to the other brake cylinder, means conditioning both of said valve means for operation to supply fluid under pressure to the brake cylinders to provide a higher degree of braking on one truck over that on another truck, said means being automatically adjustable for conditioning both of said valve means for operation to supply fluid under pressure to the brake cylinders to either increase or decrease the degree of braking on each truck, and a single device responsive to variations in the weight of lading carried by the body of the vehicle for effecting the adjustment of the conditioning means.

24. In a variable load brake for a vehicle having a plurality of trucks, in combination, a brake cylinder for each of said trucks, valve means normally connecting both of said brake cylinders to the atmosphere and operative in effecting an application of the brakes to cut off the atmospheric communication from the brake cylinders and to supply fluid under pressure to one brake cylinder, valve means operative in effecting an application of the brakes to supply fluid under pressure to the other brake cylinder, means conditioning both of said valve means for operation to supply fluid under pressure to the brake cylinders to provide a higher degree of braking on one truck over that on the other truck, said means being adjustable according to variations in the weight of lading carried by the vehicle for conditioning both of said valve means for operation to supply fluid under pressure to the brake cylinder to either increase or decrease the degree of braking on each truck.

25. In a variable load brake for a vehicle having a load carrying body and a plurality of trucks, in combination, a brake cylinder for each of said trucks, valve means operative in effecting an application of the brakes to supply fluid under pressure to one brake cylinder, valve means operative in effecting an application of the brakes to supply fluid under pressure to the other brake cylinder, means controlling the operation of both of said valve means to supply fluid under pressure to the brake cylinders to provide a heavier degree of braking on one truck over that on the other truck, said means being adjustable for conditioning both of said valve means for operation to supply fluid under pressure to the brake cylinders to either increase or decrease the degree of braking on each truck, means operative to effect the adjustment of said valve means, and a single device responsive to variations in the weight of lading carried by the body of the vehicle for actuating the adjusting means.

26. In a variable load brake for a vehicle having a load carrying body and a plurality of trucks, in combination, control means operative in effecting an application of the brakes to provide a heavier degree of braking on one truck than on the other truck, said means being adjustable for operation to either increase or decrease the degree of braking on both trucks, and a single device operative according to variations in the amount of lading carried by the body of the vehicle for adjusting the control means.

27. In a variable load brake for a vehicle having a plurality of trucks, in combination, control means operative in effecting an application of the brakes to provide a heavier degree of braking on one truck than on the other truck, said means being adjustable for operation to either increase or decrease the degree of braking on both trucks, a single mechanism operative according to variations in the amount of lading carried by the vehicle for adjusting the control means, and means operative in effecting an application of the brakes for locking said single mechanism against accidental operation to adjust the control means.

28. In a variable load brake for a vehicle having a load carrying body and a plurality of trucks, in combination, control means operative in effecting an application of the brakes to provide a heavier degree of braking on one truck than on the other truck, said means being adjustable for operation to either increase or decrease the degree of braking on both trucks, a single mechanism operative according to variations in the amount of lading carried by the body of the vehicle for adjusting the control means, means operative in initiating an application of the brakes for locking said mechanism against operation, said means being operative in effecting a release of the brakes to unlock said mechanism.

29. In a variable load brake for a vehicle having a front truck and a rear truck, in combination, control means operative in effecting an application of the brakes to provide a heavier degree of braking on the rear truck than on the front truck, said means being adjustable for operation to either increase or decrease the degree of braking on both trucks, a lever operative to adjust the control means, means responsive to variations in the pressure of the lading carried by the vehicle for actuating said lever, and means operative in effecting an application of the brakes to lock said lever against operation, said means being operative in effecting the release of the brakes to unlock said lever.

30. In a variable load brake for a locomotive tender having a water compartment and a fuel compartment and also having a front truck and a rear truck which are adapted to be each subjected to a different weight of load, in combination, control means operative to effect a heavier application of the brakes on the rear truck than on the front truck, said means being adjustable to vary the braking power on both trucks and means in communication with the water compartment responsive to variations in the weight of the water carried in the water compartment for adjusting said means.

31. In a variable load brake for a locomotive tender, in combination, a body for said tender having a recess formed in its bottom by an inverted pan-shaped hood which extends into the water compartment and which is secured to the bottom of the tender to prevent leakage of water from the water compartment to said recess, and valve means contained in said recess operative to effect an application of the brakes, said valve means being adjustable to vary the degree of application and means also contained in said recess and responsive to variations in the weight of the water carried in the water compartment for adjusting said valve means.

32. In a variable load brake for a locomotive tender, in combination, a body for said tender having a recess formed in its bottom by an inverted pan-shaped hood which extends into the water compartment and which is secured to the bottom of the tender to prevent leakage of water from the water compartment to said recess, and valve means contained in said recess and secured to said inverted pan-shaped member and operative to effect an application of the brakes, said valve means being adjustable to vary the degree of application, and means also contained in said recess and secured to said member adapted to respond to variations in the weight of the water carried by the water compartment for adjusting said valve means.

33. In a variable load brake equipment for a vehicle having a load carrying body and two trucks, a mechanism for varying the degree of braking on one truck, a mechanism for varying the degree of braking on the other truck, and a single device responsive to variations in the load carried by the body of the vehicle for adjusting said mechanisms to vary the degree of braking on said trucks.

34. In a variable load brake equipment for a vehicle having a load carrying body and two trucks, means for effecting an application of the brakes on said trucks, a mechanism for varying the degree of braking on one truck, a mechanism for varying the degree of braking on the other truck, and means directly engaged by the lading carried by the body of the vehicle responsive to variations in the weight of the lading for adjusting said mechanisms to vary the degree of braking on said trucks.

35. In a variable load brake equipment for a vehicle having a load carrying body and two trucks, a mechanism for varying the degree of braking on one truck, a mechanism for varying the degree of braking on the other truck, and a single device responsive to variations in the load carried by the body of the vehicle for adjusting said mechanisms to vary the degree of braking on said trucks, said mechanisms being so related to the adjusting means that for a given degree of braking provided on one truck, a higher degree of braking is provided on the other truck.

36. In a variable load brake equipment for a vehicle having a load carrying body and two trucks, a mechanism for varying the degree of braking on one truck, a mechanism for varying the degree of braking on the other truck, and a single device responsive to variations in the load carried by the body of the vehicle for adjusting said mechanisms to vary the degree of braking on said trucks, said mechanisms being so adjusted relative to each other, that the degree of braking obtained on one truck is higher than the degree of braking obtained on the other truck.

ELLIS E. HEWITT.